Aug. 5, 1969
R. WILSON
3,459,197
COMB-MOUNTED HAIR ANALYSIS GAUGE
Filed Dec. 18, 1967
2 Sheets-Sheet 1
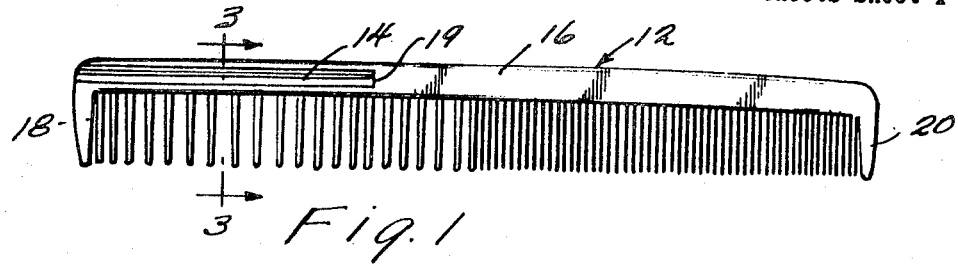
Fig. 1
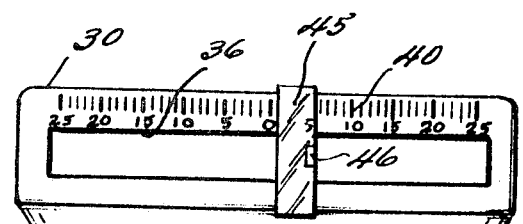
Fig. 2
Fig. 3
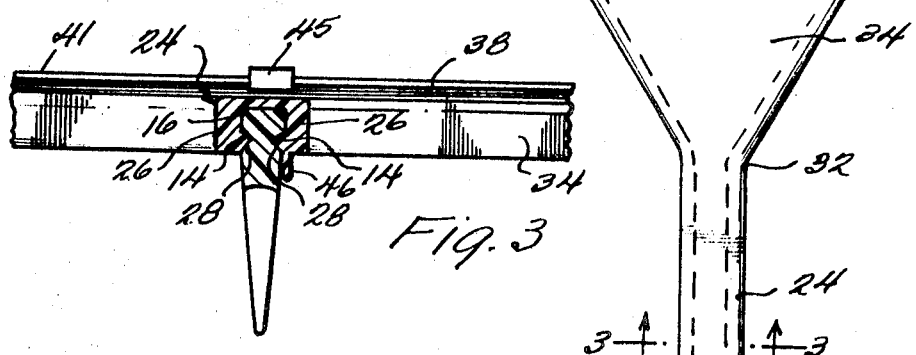
Fig. 4
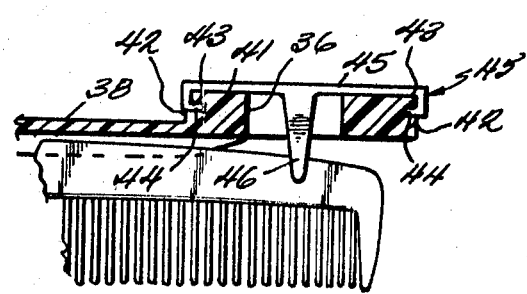
INVENTOR
RAY WILSON
BY Cushman, Darby & Cushman
ATTORNEYS

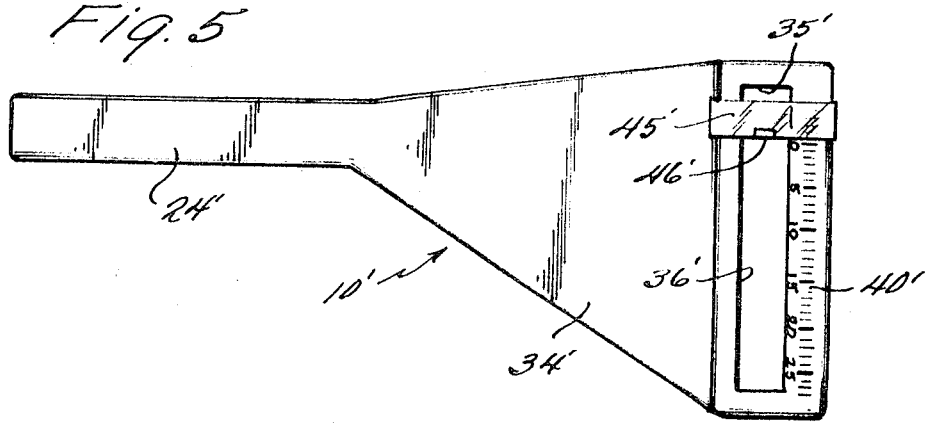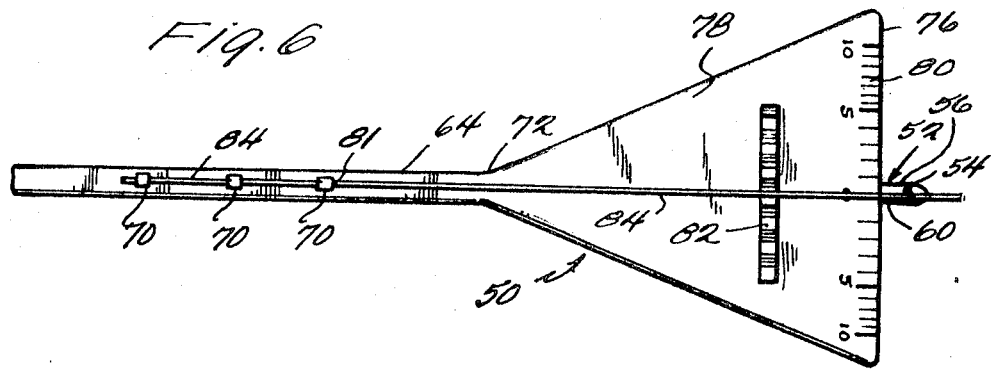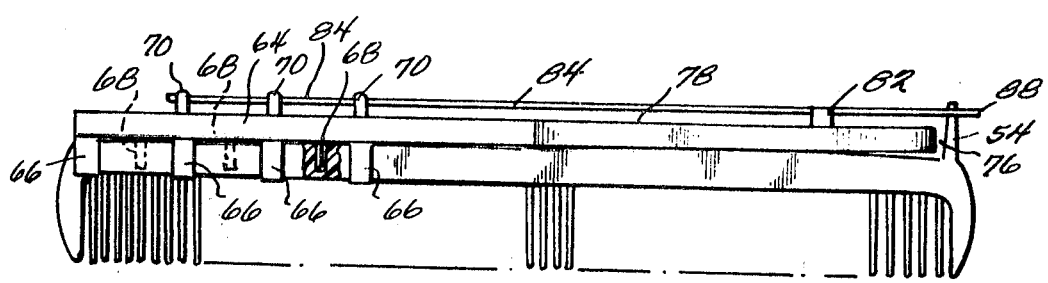

United States Patent Office 3,459,197
Patented Aug. 5, 1969

3,459,197
COMB-MOUNTED HAIR ANALYSIS GAUGE
Ray Wilson, 1958 San Marco Blvd.,
Jacksonville, Fla. 32207
Filed Dec. 18, 1967, Ser. No. 691,327
Int. Cl. A45d 24/00
U.S. Cl. 132—1        12 Claims

ABSTRACT OF THE DISCLOSURE

A comb having a laterally flexible spine has a gauge mounted thereon which includes an indicator mounted to sweep over a scale on the gauge and cam means operatively connecting the indicator and the flexing part of the comb for deflecting the indicator as the comb flexes in proportion to the resistance offered by the hair as the comb is drawn therethrough. The indicator remains deflected after the comb has been removed from the hair so a reading may be obtained from the scale.

Background and summary of the invention

Heads of hair are sufficiently difficult to analyze for the presence or absence of certain conditions and for the improvement and deterioration of such conditions that incorrect subjective judgments are often made and some conditions must worsen appreciably before their true states become apparent. These include hair thinning, kinking, drying, becoming oily, becoming damaged from bleach or other chemicals, ends splitting, and becoming dirty by electrostatic attraction of dust from the air, adsorption of solids, liquids and gases from the atmosphere onto the hair, presence of expended hair care and styling preparations such as hair spray.

In order to allow persons to keep tabs on the condition of their own hair and to assist barbers, beauticians, and hair and scalp specialists in determining what hair conditions may exist in their customers, clients or patients and whether such conditions are worsening or improving, the present invention provides a comb having a laterally flexible spine which has a gauge mounted thereon which includes an indicator mounted to sweep over a scale on the gauge and cam means operatively connecting the indicator and the flexing part of the comb for deflecting the indicator as the comb flexes in proportion to the resistance offered by the hair as the comb is drawn therethrough. The indicator remains deflected after the comb has been removed from the hair so a reading may be obtained from the scale.

It should be realized that such an instrument becomes more valuable with continued tests being made on the same head of hair under varying conditions and that a body of average figures for conditions among heads of hair can be compiled with increasing accuracy as the gauges reach broader use. Thus the device should be seen as being useful in comparing an individual's present hair combing resistance measurement with past readings from the same head of hair and with average readings taken from heads of hair of similar type. Such comparisons are useful on a day-to-day basis, for instance to be able to better judge when the hair should be washed and whether some oil adding or oil removing hair care preparation should be used; and such comparisons are useful on a month-to-month or year-to-year basis, for instance to be able to better judge the rate at which hair is thinning, whether bleaching is damaging the hair and whether the hair needs thinning out.

The principles of the invention will be further hereinafter discussed with reference to the drawings wherein preferred embodiments are shown. The specifics illustrated in the drawings are intended to exemplify, rather than limit, aspects of the invention as defined in the claims.

In the drawings:

FIGURE 1 is a side elevation view of a comb adapted to receive gauges of the present invention;

FIGURE 2 is a top plan view of a gauge according to the invention;

FIGURE 3 is a transverse cross-sectional view taken substantially along the lines 3—3 of FIGURES 1 and 2 showing the gauge of FIGURE 2 mounted on the comb of FIGURE 1;

FIGURE 4 is a fragmentary longitudinal sectional view taken substantially along the line 4—4 of FIGURE 2;

FIGURE 5 is a top plan view of a first modified gauge of the invention;

FIGURE 6 is a top plan view of an assembled gauge and comb according to another embodiment; and FIGURE 7 is a side elevation view of the gauge shown in FIGURE 6.

In the embodiment of FIGURES 1–4, a gauge 10 is provided for removable mounting on top of a flexible comb 12. The comb 12 has opposed, outwardly opening, horizontal, longitudinally extending grooves 14 in the faces of its flexible spine 16. Although shown proceeding from the coarser toothed end 18 of the comb for about forty percent of the length of the comb so as to define stops 19 at the inner end of the grooves, the latter may extend across the full length of the spine or be duplicated by like grooves extending in, for instance about forty percent of the length of the comb, from the finer toothed end 20 thereof in order to allow the gauge to be reversed with respect to the comb.

The gauge 10 includes a shank 24 having two laterally spaced, longitudinally extending dependent flanges 26 each having a horizontally inwardly projecting boss 28 thereon, shaped to enter respective of the grooves 14 to frictionally removably retain the gauge 10 on the comb 12, as is shown best in FIGURE 3. To mount the gauge on the comb, the bosses 28 are slid into the grooves 14 from the end 18 until the bosses strike the stops 19; gauge removal involves a reverse of this procedure.

As the shank 14 proceeds longitudinally forwardly, it begins broadening laterally at 32 in both senses from the longitudinal axis thereof, to provide a fan shaped region 34. The fan shaped region has a generally transversely proceeding rectangular slot 36 therethrough near its outer end 30. The upper surface 38 of the fan shaped region, adjacent the slot 36 is provided with division lines of a linear scale 40 (for instance 0–25) having its zero point substantially on the longitudinal axis of the shank 24 and its greatest point at each lateral extreme of the slot 36. The gauge fan shaped region upper surface includes a rectangular boss 41 extending the width thereof, surrounding the slot 36. The parallel, upstanding, transversely extending sidewalls 42 of the boss are provided with opposed, outwardly facing parallel grooves 43 which receive the horizontally inwardly directed opposed flanges 44 of a slide 45, for instance made of clear plastic material. The slide 45 straddles the slot 36 and scale 40. Centrally thereof, the slide 45 is provided with an indicator tab 46 which protrudes downwardly, through and below the slot 36 to a location where it will intercept the path of lateral flexing of the comb 12.

Accordingly, as the flexible comb 12, bearing the gauge 10, is grasped near the coarser toothed region 18 thereof and the finer toothed region of the comb is drawn through the user's or subject's hair in one direction, with the tab 46 on the upstream side of the comb spine 16, the fractional drag of the hair on the comb will flex the comb.

As the comb flexes it will push against the tab 46, thus displacing the slide 45 along the scale 40. A reading may be taken from the scale after the comb has been withdrawn from the hair since the comb in returning to its unflexed condition pulls away from the tab 46 without disturbing the slide 45. The slide 45 remains frictionally retained at its deflected condition until manually slid back to a null condition after a reading has been taken. In the embodiment shown the darker spot produced by the increased thickness where the tab 46 protrudes beneath the slide, conveniently provides the "hairline" of the slide, although a separate hairline could be ruled, molded, painted or otherwise formed on the slide 46 if desired.

The gauge 10 will accommodate ambidextrous users, since the slot 36 proceeds in both lateral senses from the gauge shank longitudinal centerline. To change from left-handed use to right-handed use the user merely has to place the tab 46 against the opposite face of the spine of the comb 12.

A Modified gauge for use by right-handed persons is shown at 10′ in FIGURE 5. Other elements corresponding to those of the embodiment of FIGURE 2 are provided with the same numeral designations, primed. In the modified gauge 10′, the fan shaped region fans only rightwardly from the shank longitudinal axis and the low end of the scale is at the left extreme of the slot 35′, which lies slightly leftwardly of the longitudinal axis of the gauge shank. A modified gauge for use by left-handed persons (not shown) would be a mirror image of that shown in FIGURE 5.

In the embodiments of FIGURES 6 and 7 a gauge 50 is mounted on top of a flexible comb 52. The latter has a nib 54 which projects rearwardly (i.e. upwardly) from the spine 56 of the comb at the end 58 thereof, over the end of the finer toothed section 60 of the comb 52. The comb spine 56 within the coarser toothed section 59 has a longitudinal row of vertical openings 61 therethrough.

The gauge 50 includes a shank 64 having two laterally spaced longitudinal rows of dependent flanges 66 and a single longitudinal row of dependent pins 68 located centrally, between the two flange 66 rows. Three longitudinally spaced ears 70 project rearwardly from the shank 64 opposite the flanges 66. As the shank 64 proceeds longitudinally forwardly, it begins broadening laterally at 72 in both senses from the longitudinal axis thereof, to provide a fan-shaped region 74. The fan-shaped region has a generally transversely proceeding outer end 76 provided on its upper surface 78 adjacent the end 76 with division lines of a linear scale 80 (for instance 0–10) having its zero point substantially on the longitudinal axis of the shank 64 and its greatest point (for instance 10) at each extreme of the scale. For simplicity of scale construction, the edge 76 could be made arcuate about the poin 81, the center of the foremost ear 70. A short distance back from the edge 76, the gauge upper surface 78 is provided with an upwardly projecting, transversely elongated, serrated strip 82. The gauge 50 is completed by a flexible indicator wire 84, for instance, made of polystyrene monofilament or steel wire of the type used to make whisk brooms.

One end region 86 of the indicator wire is frictionally inserted through, and held by, the ears 70. From the foremost of the ears 70, the indicator wire 84 freely projects, cantilever fashion.

The serrated strip 82 projects unwardly to the extent that it slightly interferes with lateral flexing of the free portion of the indicator wire. The interference is sufficient that should the free portion of the indicator be flexed leftwardly or rightwardly in a horizontal plane, by a force applied near the outer, free end 88 of the indicator wire, the underlying serrations of the strip 82 will retain the wire at the deflected position even after the force is removed. However, the wire end 88 may be slightly lifted or an opposite sense force applied when return of the indicator to its null position is desired. The indicator wire 88 projects over the scale 80 and extends slightly beyond the gauge end 76.

The gauge 50 is removably mounted on the comb 52 by slipping it over the comb spine so that the pins 68 enter the openings 61 and the flanges 66 frictionally grip the sides of the comb shank. The relative lengths of the comb and gauge are such that the nib 54 on the comb lies just beyond the scale edge 76.

Accordingly, as the flexible comb 52 bearing the gauge 50 is grasped near the coarser toothed region thereof and the finer toothed region of the comb is drawn through the user's or subject's hair in one direction, with the nib 54 on the downstream side of the indicator wire free end, the frictional drag of the hair on the comb will flex the comb. As the comb flexes, the nib 54 thereon will more generally laterally, for instance in a large radius, arc about the vertical axis passing through the point 81. The nib 54, bearing against the indicator wire free end, will displace the indicator wire cantilevered portion from the null position and the serrated strip 82 will hold the indicator wire in the deflected condition so that a reading may be taken on the scale 80.

As with the embodiment of FIGURE 2, the gauge of FIGURES 6 and 7 will accommodate ambidextrous users, the user merely having to place the nib 54 behind the indicator wire free end, in the sense the comb is to be drawn through the hair.

It should be apparent that the gauges of FIGURES 1–7, although structured for removable mounting on combs, could be permanently secured to the gauges or formed integrally therewith. Several combs of differing tooth coarseness and fineness may be alternately used with the gauges shown for changing ranges on the scale. For instance, should a subject's hair be so dense or kinked that drawing one comb through the hair flexes the comb to one extreme of the scale and tends to force even further deflection, a coarser toothed comb may be substituted in order to increase the range of the scale. One convenient way of doing this is to make each comb reversibly mountable with its gauge so that it may be demounted from its gauge, turned end for end, then remounted. Although the gauges shown herein are mounted on combs specially configured to receive them, it would be within the purview of the invention to modify the mounting means of the gauges so the gauges could be mounted on standard combs of the flexible type. The combs and gauges herein are preferably made of plastic material such as styrene, ABS, hard rubber; or of metal such as aluminum or stainless steel.

It should now be apparent that the comb-mounted hair analysis gauge as described hereinabove possesses each of the attributes set forth in the specification under the heading "Background and Summary of the Invention" hereinbefore. Because the comb-mounted hair analysis gauge of the invention can be modified to some extent without departing from the principles of the invention as they have been outlined and explained in this specification, the present invention should be understood as encompassing all such modifications.

What is claimed is:

1. A hair combing resistance gauge for mounting on a hair comb having teeth projecting down from a laterally flexible spine, said gauge comprising: a shank having means thereon for securing said shank to the comb spine along part of the length of the spine; a transversely extending plate on said gauge; said plate having a transversely extending scale delineated thereon; said plate being secured to said shank and being primarily supported by said shank, cantilever fashion so as to overlie the flexible spine of the comb longitudinally beyond the means securing the shank to the comb spine; an indicator mounted on said gauge to sweep over the scale thereon; and cam means on the indicator arranged to be engaged by the comb during flexing of the comb for deflecting the indicator along the scale to provide an indication of the resistance offered by the hair as the comb is drawn through the hair.

2. The gauge of claim 1, further including means on said plate engageable with said indicator upon deflection thereof for holding said indicator in deflected condition to facilitate taking a reading of the magnitude of said deflected condition from said scale.

3. The gauge of claim 1 wherein said plate is generally fan-shaped and enlarges leftwardly and rightwardly as it extends longitudinally from said shank; said scale having a null lying substantially on the longitudinal centerline of the shank, and having extremes near opposite edges of said fan-shaped plate, whereby said gauge is adapted to be used left-handedly and right-handedly.

4. The gauge of claim 1 wherein said plate is generally fan-shaped and enlarges in one lateral sense as it extends longitudinally from said shank, so as to have one obliquely extending side edge; said scale having a null lying substantially on the longitudinal center line of the shank, and having the extreme thereof near said obliquely extending side edge, whereby said gauge is adapted for operative movement with respect to the haid in the sense opposite the sense of increase of said scale.

5. The gauge of claim 1 further including a transversely extending, vertically opening slot through said plate adjacent said scale; said indicator including a slide, means slidably mounting said slide on said plate for sweeping over said slot and said scale; said cam means including a tab secured to said slide and depending therefrom into the path of the comb.

6. The gauge of claim 5 wherein the slide overlies the slot and said scale, and said tab depends from the slide through the slot.

7. The gauge of claim 6 including means defining two opposed, transversely extending grooves on said plate and two opposed flanges on said slide, said flanges being received in and being frictionally slidable along respective of said grooves to mount said slide on said plate.

8. The gauge of claim 1 wherein said transversely extending scale lies adjacent an outer, transverse end edge of said plate, wherein said indicator comprises a thin flexible rod overlying said shank; means securing said rod adjacent a rear end thereof to said shank, said rod extending forwardly cantilever fashion, from said securing means and having a free forward end portion thereof passing over said scale and extending at least slightly beyond said plate transverse end edge; the free end portion of said rod which protrudes past said end edge providing said cam means for engagement by the comb.

9. The gauge of claim 8 further including a strip of serrations extending transversely on said plate adjacent said scale, said serrations projecting upwardly from said plate into interference with the path of lateral flexing of said flexible rod, said serrations being constructed and arranged to hold said rod in deflected conditions to facilitate taking a reading of the magnitude of said deflected condition from said scale.

10. In combination:
    a hair comb having a plurality of teeth projecting down from a laterally flexible spine; and
    a hair combing resistance gauge comprising: a shank having means thereon securing said shank to the comb spine along part of the length of the spine; a transversely extending plate on said gauge; said plate having a transversely extending scale delineated thereon; said plate being secured to said shank and being primarily supported by said shank, cantilever fashion so as to overlie the flexible spine of the comb longitudinally beyond the means securing the shank to the comb spine; an indicator mounted on said gauge to sweep over the scale thereon; and cam means on the indicator arranged to be engaged by the comb during flexing of the comb for deflecting the indicator along the scale to provide an indication of the resistance offered by the hair as the comb drawn through the hair.

11. The combination of claim 10 including a pair of oppositely laterally outwardly opening grooves on the spine of said comb extending from one end of said spine along at least a substantial part of the longitudinal extent thereof toward the opposite end of said comb spine; said means on said gauge shank for securing said shank to the comb spine comprising a pair of laterally spaced, dependent, longitudinally extending flanges on said shank having opposed laterally inwardly extending projections thereon, said projections being removably, frictionally, slidably received in respective of said pair of grooves on said comb spine to removably mount said gauge on said comb.

12. The combination of claim 10 wherein said indicator comprises a flexible rod which extends longitudinally beyond said plate to define said cam means thereof; said comb also extending longitudinally beyond said plate; an upward projection being defined on said comb spine longitudinally beyond said plate, said projection being constructed and arranged to bear against the cam means of said indicator to flex said indicator as said comb flexes.

References Cited
UNITED STATES PATENTS

| | | | |
|---|---|---|---|
| 459,012 | 9/1891 | Marsh | 132—45 |
| 2,510,943 | 6/1950 | Arnold | 132—45 |
| 2,556,805 | 6/1951 | Forward | 132—45 |
| 2,562,421 | 7/1951 | Hendra | 132—45 |

F. BARRY SHAY, Primary Examiner

JAMES W. MITCHELL, Assistant Examiner

U.S. Cl. X.R.

73—141; 132—45, 11